United States Patent
Itasaka

(10) Patent No.: US 12,470,098 B2
(45) Date of Patent: Nov. 11, 2025

(54) ROTOR STRUCTURE OF ROTARY ELECTRIC MACHINE

(71) Applicant: Mazda Motor Corporation, Hiroshima (JP)

(72) Inventor: Naoki Itasaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 191 days.

(21) Appl. No.: 18/407,723

(22) Filed: Jan. 9, 2024

(65) Prior Publication Data

US 2024/0258848 A1 Aug. 1, 2024

(30) Foreign Application Priority Data

Jan. 31, 2023 (JP) .................................. 2023-012769

(51) Int. Cl.
*H02K 1/276* (2022.01)

(52) U.S. Cl.
CPC ....... *H02K 1/2766* (2013.01); *H02K 2213/09* (2013.01)

(58) Field of Classification Search
CPC .......................... H02K 1/2766; H02K 2213/09
See application file for complete search history.

(56) References Cited

U.S. PATENT DOCUMENTS

2021/0249919 A1 8/2021 Yang et al.

FOREIGN PATENT DOCUMENTS

| CN | 105978198 A | 9/2016 | |
| EP | 2048772 A1 | 4/2009 | |
| EP | 2246966 A1 | 11/2010 | |
| JP | 2021027700 A | 2/2021 | |
| WO | WO-2014155438 A1 * | 10/2014 | ............. H02K 21/14 |

OTHER PUBLICATIONS

European Patent Office, Extended European Search Report Issued in Application No. 24153841.2, Jul. 23, 2024, Germany, 16 pages.

* cited by examiner

*Primary Examiner* — Viet P Nguyen
(74) *Attorney, Agent, or Firm* — Alleman Hall & Tuttle LLP

(57) ABSTRACT

A rotor structure includes a rotor, a stator, and magnetic pole parts provided to a rotor core. Each magnetic pole part includes a radially-magnetized fixed magnetic-force magnet, an auxiliary fixed magnetic-force magnet disposed radially outward of the fixed magnetic-force magnet and radially magnetized in the same direction as the fixed magnetic-force magnet, and first variable magnetic-force magnets disposed at both sides of the fixed magnetic-force magnet in the circumferential direction. A magnetization state of the first variable magnetic-force magnets is changeable in the circumferential direction by a given magnetic flux. A cavity part is formed between the auxiliary fixed magnetic-force magnet and the first variable magnetic-force magnets in the circumferential direction to have a circumferential width at a position of the auxiliary fixed magnetic-force magnet in the radial direction narrower than a minimum width of a gap between the rotor core and a stator core.

9 Claims, 6 Drawing Sheets

ROTOR STRUCTURE OF ROTARY ELECTRIC MACHINE

TECHNICAL FIELD

The art disclosed herein belongs to a technical field related to a rotor structure of a rotary electric machine.

BACKGROUND OF THE DISCLOSURE

In recent years, as a rotor of a rotary electric machine, one provided with a fixed magnetic-force magnet for which it is difficult to change a magnetization state, and a variable magnetic-force magnet for which its magnetization state is easily changed is proposed.

JP2021-027700A discloses a rotor structure provided with a plurality of magnetic pole parts which are lined up in a circumferential direction of a rotor core. Each magnetic pole part includes a first fixed magnetic-force magnet disposed at the center in the circumferential direction, a variable magnetic-force magnet which is disposed on both sides of the first fixed magnetic-force magnet in the circumferential direction and radially outward of the fixed magnetic-force magnet, a magnetization state thereof being changeable, and a second fixed magnetic-force magnet disposed radially inward of the first fixed magnetic-force magnet. The first fixed magnetic-force magnet is disposed magnetically in series with the variable magnetic-force magnet, and the second fixed magnetic-force magnet is disposed magnetically in parallel with the variable magnet.

Further, in JP2021-027700A, a cavity is formed in a slit where the first fixed magnetic-force magnet is disposed as a flux barrier. The cavity is located longitudinally outward of the first fixed magnetic-force magnet.

In the case of the rotor structure like JP2021-027700A, the first fixed magnetic-force magnet and the second fixed magnetic-force magnet are magnetized so that their radially outward sides become N-poles. When the magnetizing direction of the variable magnetic-force magnet is oriented in a direction from the variable magnet to the first fixed magnetic-force magnet, the magnetic flux which interlinks with a stator is increased (hereinafter, referred to as a "magnetizing state"). On the other hand, when the magnetizing direction of the variable magnetic-force magnet is oriented in a direction from the first fixed magnetic-force magnet to the variable magnetic-force magnet, the magnetic flux which interlinks with the stator is decreased (hereinafter, referred to as a "demagnetizing state").

In the rotor structure of JP2021-027700A, because of the cavity formed longitudinally outward of the first fixed magnetic-force magnet, an effect of suppressing a short circuit of the magnetic flux of the first fixed magnetic-force magnet can be expected. Therefore, repulsion between the magnetic flux from the second fixed magnetic-force magnet and the magnetic flux from the first fixed magnetic-force magnet is suppressed.

However, according to this configuration, in the demagnetizing state, the magnetic flux from the first fixed magnetic-force magnet may leak to the stator side while avoiding the cavity, and thereby, an increase in an iron loss due to a magnetic flux change of the stator may occur. Thus, there is room for improvement from the viewpoint of suppressing the iron loss in the demagnetizing state, while suppressing the short circuit of the magnetic flux of the magnet located radially outward, when the magnets are lined up in a radial direction of the rotor core.

SUMMARY OF THE DISCLOSURE

The art disclosed herein is made in view of the situation described above, and one purpose thereof is to suppress a short circuit of a magnetic flux of a magnet located radially outward when the magnets are lined up in the radial direction, and suppress iron loss as much as possible when changing a magnetization state of a variable magnet so that a magnetic flux which interlinks with a stator is decreased.

In order to solve the above-described problem, a first aspect of the art disclosed herein relates to a rotor structure of a rotary electric machine, which includes a rotor having a rotor core, a stator having a stator core, the stator core being disposed radially outward of the rotor core and being separated from the rotor core with a gap therebetween, and a plurality of magnetic pole parts provided to the rotor core and lined up in a circumferential direction of the rotor core. Each of the magnetic pole parts includes a fixed magnetic-force magnet configured to be magnetized in a radial direction of the rotor core, an auxiliary fixed magnetic-force magnet disposed radially outward of the fixed magnetic-force magnet, and magnetized in the radial direction so that a magnetizing direction thereof becomes the same direction as that of the fixed magnetic-force magnet, and first variable magnetic-force magnets disposed at both sides of the fixed magnetic-force magnet in the circumferential direction, a magnetization state of the first variable magnetic-force magnets being changeable in the circumferential direction by a given magnetic flux. Magnetizing directions of the fixed magnetic-force magnet and the auxiliary fixed magnetic-force magnet of one of the magnetic pole parts and magnetizing directions of the fixed magnetic-force magnet and the auxiliary fixed magnetic-force magnet of another magnetic pole part adjacent to the one magnetic pole part are opposite from each other. The first variable magnetic-force magnets are located radially outward of the fixed magnetic-force magnet. A cavity part is formed in the rotor core, between the auxiliary fixed magnetic-force magnet and the first variable magnetic-force magnets in the circumferential direction, the cavity part extending from the auxiliary fixed magnetic-force magnet to the fixed magnetic-force magnet in the radial direction. A width of the cavity part in the circumferential direction at a position of the auxiliary fixed magnetic-force magnet in the radial direction is narrower than a minimum width of the gap between the rotor core and the stator core.

According to this configuration, when the magnetizing direction of the fixed magnetic-force magnet of one magnetic pole part is a direction from radially inside to outside, for one magnetic pole part, when the magnetizing direction of the first variable magnetic-force magnets is oriented in a direction from each first variable magnetic-force magnet toward the fixed magnetic-force magnet, the magnetic flux which interlinks with the stator is increased (hereinafter, referred to as a "magnetizing state"). On the other hand, when the magnetizing direction of the first variable magnetic-force magnets is oriented in a direction from the fixed magnetic-force magnet to the first variable magnetic-force magnets, the magnetic flux which interlinks with the stator is decreased (hereinafter, referred to as a "demagnetizing state"). On the other hand, as for another magnetic pole part adjacent to the one magnetic pole part, when the magnetizing direction of the first variable magnetic-force magnets is oriented in a direction from each first variable magnetic-force magnet toward the fixed magnetic-force magnet, the demagnetizing state occurs, and when the magnetizing direction of the first variable magnetic-force magnets is oriented in a direction from the fixed magnetic-force magnet to each first variable magnetic-force magnet, the magnetizing state occurs.

According to the above configuration, by forming the cavity part so as to be adjacent in the circumferential direction to the auxiliary fixed magnetic-force magnet which is located relatively outward in the radial direction, short-circuit of the magnetic flux of the auxiliary fixed magnetic-force magnet can be suppressed.

Further, according to the above configuration, since the circumferential width of the cavity part is narrower than the minimum width of the gap between the rotor core and the stator core, it becomes easier for the magnetic flux from the fixed magnetic-force magnet and the auxiliary fixed magnetic-force magnet to go toward the first variable magnetic-force magnets in the demagnetizing state. Thus, the magnetic flux from the fixed magnetic-force magnet and the auxiliary fixed magnetic-force magnet of the one magnetic pole part goes toward the fixed magnetic-force magnet and the auxiliary fixed magnetic-force magnet of the another magnetic pole part via the first variable magnetic-force magnets. Therefore, a closed magnetic path can be formed between the one magnetic pole part and the another magnetic pole part, and leakage of the magnetic flux to the stator can be suppressed as much as possible. As a result, the iron loss can be suppressed as much as possible.

According to a second aspect of the art disclosed herein, in the first aspect, the width of the cavity part in the circumferential direction may be wider in a part of the cavity part radially inward of the auxiliary fixed magnetic-force magnet than a part of the cavity part radially outward of the auxiliary fixed magnetic-force magnet.

According to the above configuration, the magnetic flux from the auxiliary fixed magnetic-force magnet passing through the cavity radially inward of the auxiliary fixed magnetic-force magnet can be suppressed. Thus, the short-circuit of the magnetic flux of the auxiliary fixed magnetic-force magnet can be suppressed more effectively.

According to a third aspect of the art disclosed herein, in the second aspect, spacing between the auxiliary fixed magnetic-force magnet and the cavity part in the circumferential direction may be narrower than spacing between the auxiliary fixed magnetic-force magnet and an outer edge of the rotor core in the radial direction.

According to the above configuration, since the width between the auxiliary fixed magnetic-force magnet and the cavity part is comparatively narrow, the short-circuit of the magnetic flux of the auxiliary fixed magnetic-force magnet can be suppressed more effectively.

According to a fourth aspect of the art disclosed herein, in any one of the first to third aspects, the first variable magnetic-force magnets may be disposed adjacent to a q-axis. Each of the magnetic pole parts may have a respective second variable magnetic-force magnet between the cavity part and each first variable magnetic-force magnet, a magnetization state of each second variable magnetic-force magnet being changeable in the circumferential direction by the given magnetic flux.

According to the above configuration, since the magnetization state of the second variable magnetic-force magnet is changeable by the same magnetic flux as the first variable magnetic-force magnets, the magnetizing directions of the first variable magnetic-force magnets and the second variable magnetic-force magnet in the circumferential direction are the same. Thus, it becomes easier for the magnetic flux from the fixed magnetic-force magnet and the auxiliary fixed magnetic-force magnet to go toward the first variable magnetic-force magnets by way of the second variable magnetic-force magnet. Accordingly, since it becomes easier to form the closed magnetic path between the one magnetic pole part and the another magnetic pole part, the iron loss can be suppressed more effectively.

DETAILED DESCRIPTION OF THE DISCLOSURE

Hereinafter, illustrative embodiments will be described in detail with reference to the accompanying drawings.

Embodiment 1

<Configuration of Vehicle>

Figure 1:
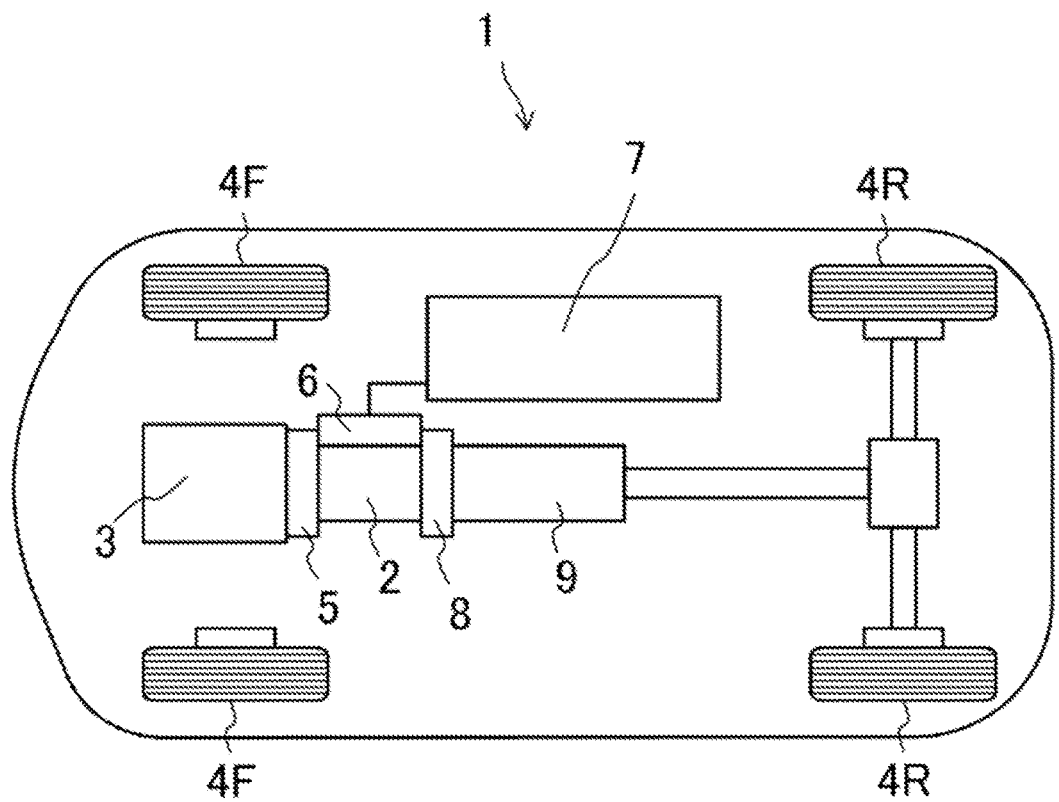
FIG. 1 is a schematic view of an automobile provided with a drive motor having a rotor structure according to Embodiment 1.

An automobile 1 provided with a drive motor 2 having a rotor structure according to Embodiment 1 is schematically illustrated in FIG. 1. The automobile illustrated herein is a hybrid vehicle. As drive sources of the automobile, an engine 3 is mounted in addition to the drive motor 2 (variable magnetic-force motor) to which the disclosed art is applied. These collaboratively rotate two of four wheels 4F, 4F, 4R, and 4R (two driving wheels 4R) located in a left-right symmetry. Therefore, the automobile 1 moves (travels).

In the case of this automobile 1, the engine 3 is disposed at the front side of the vehicle body, and the driving wheels 4R are disposed at the rear side of the vehicle body. That is, this automobile 1 is a so-referred to as "FR (front-engine, rear wheel drive) vehicle." Further, the engine 3 is mainly used as the drive source of this automobile, and the drive motor 2 is used to assist the drive of the engine 3 (so-referred to as "mild hybrid"). The drive motor 2 is also used as a power generator (so-referred to as "regenerator").

The engine 3 is an internal combustion engine which combusts using gasoline as fuel, for example. The engine 3 may be a diesel engine which uses diesel oil as fuel. The drive motor 2 is coupled to the rear of the engine 3 via a first clutch 5. The drive motor 2 is a permanent magnet synchronous motor which is driven by three-phase alternate current.

This drive motor 2 is a variable magnetic-force motor as described above. Its rotor is provided with a fixed magnetic-force magnet 40 and variable magnetic-force magnets 51 and 52 which will be described later, and magnetic forces of the variable magnetic-force magnets 51 and 52 are changeable. The structure of the rotor is devised to improve the motor performance. The details of the drive motor 2 will be described later.

The drive motor 2 is coupled to a drive battery 7 via an inverter 6. The drive battery 7 is comprised of a plurality of lithium-ion batteries. The rated voltage of the drive battery 7 is less than 50 V (in detail, 48 V). The drive battery 7 supplies direct current power to the inverter 6. The inverter 6 converts the direct current power into the three-phase alternate current with different phases, and supplies it to the drive motor 2. Therefore, the drive motor 2 rotates.

A transmission 9 is coupled to the rear of the drive motor 2 via a second clutch 8. The transmission 9 is a multi-stage automatic transmission (so-referred to as "AT"). A rotational motive force outputted from the engine 3 and/or the drive motor 2 is outputted to the transmission 9 through the second clutch 8. The transmission 9 is coupled to a differential gear via a propeller shaft.

The differential gear is coupled to the left and right driving wheels 4R via a pair of driving shafts. When the automobile 1 is propelled (powering), the rotational motive force which is changed in the speed by the transmission 9 is distributed by the differential gear, and the distributed forces are transmitted to the respective driving wheels 4R.

When the automobile 1 slows down (regeneration), energy consumed by the drive motor 2 is recovered. In detail, when the automobile 1 brakes, the first clutch 5 is released while connecting the second clutch 8. Thus, the rotational motive force from the driving wheels rotates the drive motor 2 to generate electricity. This electric power is charged to the drive battery 7 to collect energy.

<Improvement in Fuel Efficiency>

In the case of the hybrid vehicle, since the engine 3 is mainly used when powering, the influence of the drive motor 2 on the fuel efficiency is small. On the other hand, since the drive motor 2 is mainly used when regenerating, the influence of the drive motor 2 on the fuel efficiency is large.

Since the automobile 1 slows down very often, the energy consumed during slowdown is large. Therefore, for the improvement in the fuel efficiency of the hybrid vehicle, it is important to increase the rate of the energy recovery during regeneration.

For that purpose, an increase in the output of the drive motor 2 is effective. To increase the output, it is effective to enable the change in the magnetic force of a rotor 10 of the drive motor 2 (i.e., to adopt the variable magnetic-force motor as the drive motor 2). It becomes possible to optimize the power factor in a wide operating range if the drive motor 2 is the variable magnetic-force motor, and therefore, the drive motor 2 becomes high in the output.

By optimizing the power factor (i.e., making opposing components of the magnetic forces of a stator 20 and the rotor 10 substantially in agreement with each other), the drive motor 2 can be high in the output. On the other hand, in the case of the normal permanent-magnet synchronous motor, the magnetic force of the rotor 10 is constant. Therefore, the power factor can be optimized only in a part of the operating range.

On the other hand, since the magnetic force of the rotor 10 can be changed if it is a variable magnetic-force motor, the power factor can be optimized in the wide operating range. In addition, if the power factor can be optimized in the wide operating range, the drive motor 2 can be made high in the output. Further, since an improvement in the efficiency may also be realized by devising, the fuel efficiency of the automobile 1 can be improved.

<Operating Range of Drive Motor>

Figure 2:
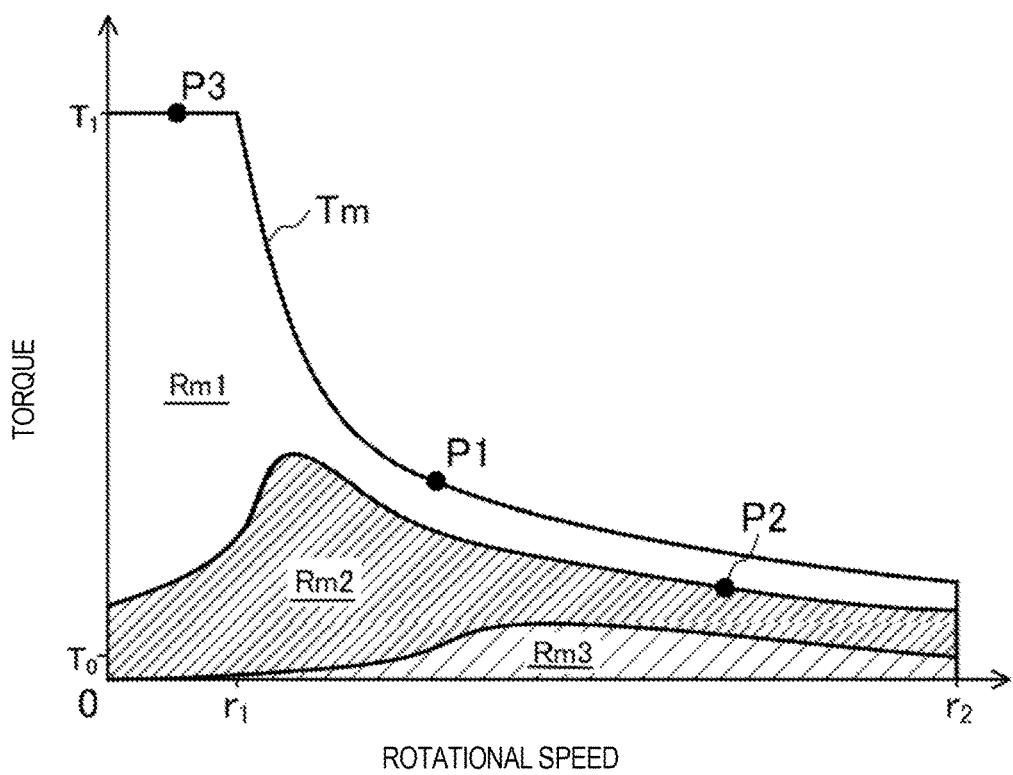
FIG. 2 is a graph illustrating an operating efficiency of the drive motor.

FIG. 2 illustrates a map where the operating range of the drive motor 2 is indicated. In this map, the operating range which can be outputted by the drive motor 2 is defined by a load upper limit line Tm indicating an upper limit value of torque (load) at each rotational speed.

In detail, in a low-speed range up to a given engine speed $r_1$, the upper limit of the torque is held at a maximum torque $T_1$. In a middle-speed range and a high-speed range where the engine speed is higher than the low-speed range, the upper limit of the torque is gradually decreased until the engine speed reaches an upper limit $r_2$. The operating range of the variable magnetic-force motor is divided into a plurality of magnetizing areas according to the magnetic force of the rotor 10 so that the power factor is optimized. In the illustrated map, it is divided into three magnetizing areas.

That is, it is divided into a first magnetizing area Rm1 which includes the maximum torque $T_1$ and extends on the high-load side along the load upper limit line, a second magnetizing area Rm2 which extends on the low-load side of the first magnetizing area Rm1, and a third magnetizing area Rm3 which extends on the low-load side of the second magnetizing area Rm2 and includes a torque $T_0$ at which the drive motor 2 idles at the high-rotational side (a torque which does not contribute to traveling of the automobile 1).

As for these magnetizing areas, optimal magnetic forces corresponding to respective outputs are set. Normally, the magnetic force of the first magnetizing area Rm1 is larger than the magnetic force of the second magnetizing area Rm2, and the magnetic force of the third magnetizing area Rm3 is set smaller than the magnetic force of the second magnetizing area Rm2.

The magnetizing area is estimated based on the operating state of the drive motor 2 while the automobile 1 travels, and when transitioning through the magnetizing area, the magnetic force of the rotor 10 is changed according to the magnetic force of the corresponding magnetizing area. For example, when transitioning from the second magnetizing area Rm2 to the first magnetizing area Rm1, the drive motor 2 is magnetized. At an operation point P3 (slope start, etc.) in FIG. 2, magnetization as described is performed when transitioning to the high-load side. When transitioning from the second magnetizing area Rm2 to the third magnetizing area Rm3, the drive motor 2 is demagnetized. At an operation point P2 (high-speed cruising, etc.) in FIG. 2, demagnetization as described is performed when transitioning to the low-load side. At an operation point P1 (passing acceleration, etc.), continuous high output at middle speed is required when the drive motor 2 is driven in an operating range with middle load to low load and high speed.

Although the details will be described later, when magnetizing or demagnetizing, a large pulse-shaped current is applied to given coils 22 at a timing when the rotor 10 becomes at a given position with respect to the stator 20. Thus, a strong magnetic field is generated from the stator 20 to the variable magnetic-force magnets 51 and 52 which are targets to be processed. Therefore, the variable magnetic-force magnets 51 and 52 are magnetized until a given magnetic force is obtained.

The direction of the magnetic field which occurs in magnetizing is opposite from the direction of the magnetic field in demagnetization. In magnetizing, magnetization is conducted so that the magnetic force of the variable magnetic-force magnets 51 and 52 is oriented in the same direction as the magnetic force of the fixed magnetic-force magnet 40. In demagnetization, magnetization is conducted so that the magnetic force of the variable magnetic-force magnets 51 and 52 is oriented in the opposite direction from the magnetic force of the fixed magnetic-force magnet 40. Depending on the state of magnetization, the direction and the magnitude of the magnetic force of the variable magnetic-force magnets 51 and 52 can be changed.

However, magnetization is limited by onboard apparatuses. That is, in order to magnetize the magnetic force of the variable magnetic-force magnets 51 and 52 strongly, it is necessary to supply large current to the drive motor 2, and therefore, magnetization is limited by the voltage of the drive battery 7 and the capacity of the inverter 6.

Although increasing the sizes of these apparatuses may be considered, it is difficult to increase the sizes because they are mounted on the vehicle. Therefore, according to the art disclosed herein, the structure of the drive motor 2 (particularly, the structure of the rotor 10) is devised so that magnetizing can be conducted appropriately under the limited condition using the existing apparatuses.

<Configuration of Drive Motor>

Figure 3:
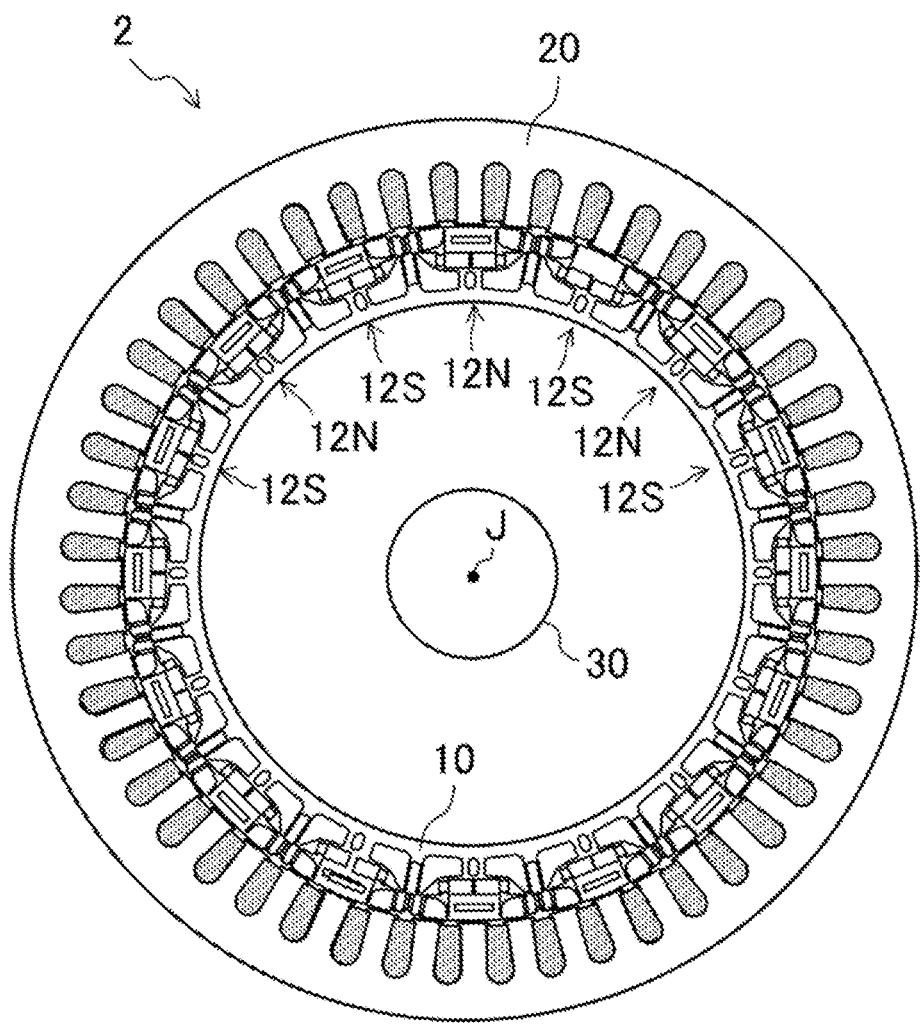
FIG. 3 is a cross-sectional view of the drive motor.

FIG. 3 illustrates a cross section of the drive motor 2. As illustrated in FIG. 3, the drive motor 2 is a 16-pole motor having 16 magnetic pole parts 12 (described later). The drive motor 2 includes the rotor 10, the stator 20, and a shaft 30.

In the following description, a "rotation axis direction" or an "axial direction" indicates a direction in which a rotation axis J extends. A radial direction indicates a direction of a radius centering on the rotation axis J. A circumferential direction indicates a direction around the rotation axis J. As for the radial direction, the side far from the rotation axis J is referred to as "radially outward," and the side closer to the rotation axis J is referred to as "radially inward."

[Stator]

The stator 20 opposes to the rotor 10 in the radial direction with spacing therebetween. The stator 20 has a stator core 21 and a plurality of coils 22.

The stator core 21 has a back yoke 21a formed in an annular shape, and a plurality of (48) teeth 21b which project radially inward from the back yoke 21a. For example, the stator core 21 is a laminated core constituted by laminating in the rotation axis direction a plurality of electromagnetic steel plates with high magnetic permeability.

The plurality of coils 22 are wound around the plurality of the teeth 21b, respectively. When electric current is supplied to the plurality of coils 22, a magnetic flux is generated in each of the plurality of coils 22. For example, the plurality of coils 22 constitute a three-phase coil group which is comprised of U-phase, V-phase, and W-phase which are different in the phase of the electric current which flows. The coils 22 of these phases are disposed in order in the circumferential direction.

In this example, the magnetic flux which is generated in the plurality of coils 22 includes a rotation magnetic flux which is a magnetic flux for rotating the rotor 10, and a variable magnetic flux (given magnetic flux) which is a magnetic flux for changing the magnetization states of the first variable magnetic-force magnet 51 and the second variable magnetic-force magnet 52 which will be described later.

For example, the rotation magnetic flux is generated in the plurality of coils 22 by supplying alternate current to the plurality of coils 22. The rotor 10 is rotated by this rotation magnetic flux. Further, variable magnetic flux is generated in the plurality of coils 22 by supplying given current (for example, pulse current higher than alternate current which generates the rotation magnetic flux) to the plurality of coils 22 for a given period of time, while the rotor 10 rotates (or stops). By this variable magnetic flux, the magnetization states of the first variable magnetic-force magnet 51 and the second variable magnetic-force magnet 52 (described later) change.

[Rotor]

Figure 4:
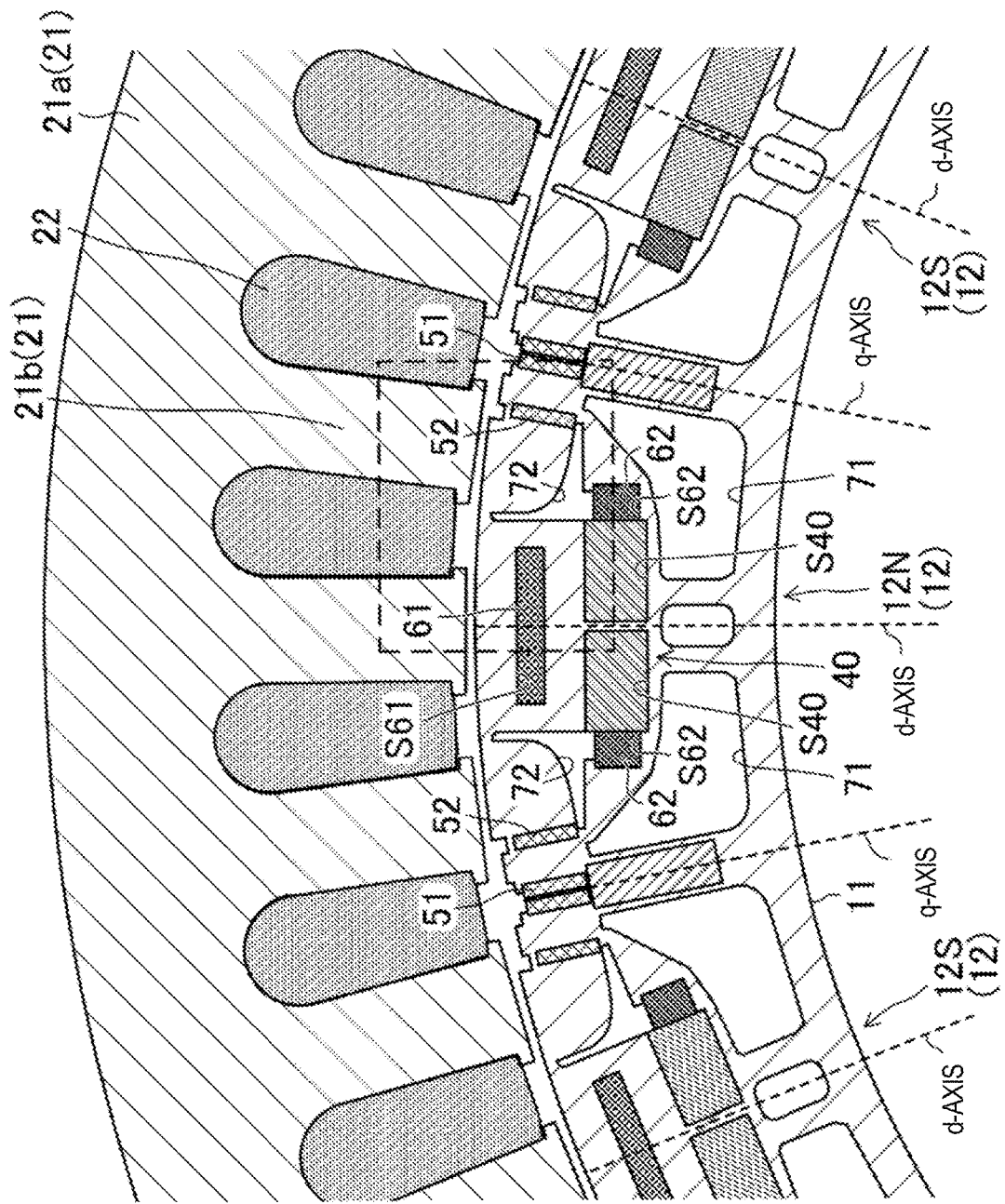
FIG. 4 is an enlarged cross-sectional view where a magnetic pole part of the drive motor is enlarged.

Next, the rotor 10 is described with reference to FIGS. 4 to 6. The rotor 10 includes a rotor core 11 and a plurality of magnetic pole parts 12.

[Rotor Core]

The rotor core 11 is formed in a cylindrical shape. For example, the rotor core 11 is a laminated core in which a plurality of electromagnetic steel plates with high magnetic permeability are laminated in the axial direction. A shaft hole is formed in a central part of the rotor core 11. The shaft 30 is inserted in and fixed to the shaft hole.

[Magnetic Pole Part]

The plurality of magnetic pole parts 12 are provided to the rotor core 11, and are lined up in the circumferential direction. Each of the plurality of magnetic pole parts 12 has the fixed magnetic-force magnet 40, two first variable magnetic-force magnets 51, two second variable magnetic-force magnets 52, a first auxiliary fixed magnetic-force magnet 61, and two second auxiliary fixed magnetic-force magnets 62.

The magnetic pole parts 12 which are adjacent to each other in the circumferential direction of the rotor 10 differ in the magnetic properties. In detail, the magnetizing directions of the fixed magnetic-force magnet 40, the first auxiliary fixed magnetic-force magnet 61, and the second auxiliary fixed magnetic-force magnet 62 are inverted. In the following description, some of the plurality of magnetic pole parts 12 are referred to as a "first magnetic pole part 12N," and magnetic pole parts 12 which are adjacent to the first magnetic pole parts 12N in the circumferential direction are referred to as a "second magnetic pole parts 12S."

Note that since the first magnetic pole part 12N and the second magnetic pole part 12S only differ in the magnetizing directions of the fixed magnetic-force magnet 40, the first auxiliary fixed magnetic-force magnet 61, and the second auxiliary fixed magnetic-force magnet 62, and same in other configurations, each will simply be described in the following description as the magnetic pole part 12, without distinguishing the first magnetic pole part 12N and the second magnetic pole part 12S from each other, unless otherwise particularly described.

<Fixed Magnetic-Force Magnet>

The fixed magnetic-force magnet 40 is comprised of a pair of magnets. The fixed magnetic-force magnet 40 is embedded in the rotor core 11. In this example, the fixed magnetic-force magnet 40 is accommodated in a fixed magnetic-force magnet hole S40 formed in the rotor core 11. Further, the fixed magnetic-force magnet 40 extends in a direction perpendicular to the radial direction (i.e., tangential direction). In detail, the fixed magnetic-force magnet 40 is formed in a rectangular shape in cross section, and its long-side direction is oriented in the tangential direction.

Further, the fixed magnetic-force magnet 40 is magnetized in the radial direction. In this example, the fixed magnetic-force magnet 40 of the first magnetic pole part 12N is magnetized so that its radially outward end becomes an N-pole. The fixed magnetic-force magnet 40 of the second magnetic pole part 12S is magnetized so that its radially outward end becomes an S-pole.

As for the fixed magnetic-force magnet 40, a magnet with high flux density and large coercive force, such as a neodymium magnet, is used. The fixed magnetic-force magnet 40 does not substantially change in the magnetization state even if a given magnetic flux (for example, the magnetic flux generated by the large current (for example, 750 Arms) which is outputtable by the drive battery 7 and the inverter 6) is applied. The coercive force of the fixed magnetic-force magnet 40 is larger than the coercive forces of the first variable magnetic-force magnet 51 and the second variable magnetic-force magnet 52. Although these fixed magnetic-force magnets 40 may be different magnetic bodies, the same magnetic body is used in this rotor 10.

<First Variable Magnetic-Force Magnet>

The first variable magnetic-force magnets 51 are disposed at parts on one-end side and the other-end side of the fixed magnetic-force magnet 40 in the first magnetic pole part 12N in the circumferential direction, respectively. Each first variable magnetic-force magnet 51 is disposed radially outward of the fixed magnetic-force magnet 40.

Each first variable magnetic-force magnet 51 is disposed adjacent to a q-axis. Each first variable magnetic-force magnet 51 of the first magnetic pole part 12N is adjacent to the first variable magnetic-force magnet 51 of the second magnetic pole part 12S having the q-axis therebetween. The q-axis is a virtual line which passes through between two magnetic pole parts 12 which are adjacent to each other in the circumferential direction, and extends in the radial direction.

The circumferential length between the first variable magnetic-force magnet 51 and the q-axis is shorter than the circumferential length between the first variable magnetic-force magnet 51 and the fixed magnetic-force magnet 40. The first variable magnetic-force magnet 51 opposes to the fixed magnetic-force magnet 40 in the circumferential direction with spacing therebetween.

The first variable magnetic-force magnet 51 is embedded in the rotor core 11. In this example, the first variable magnetic-force magnet 51 is accommodated in a first variable magnetic-force magnet hole S51 formed in the rotor core 11. Further, the first variable magnetic-force magnet 51 extends along the q-axis (the q-axis which is adjacent thereto in the circumferential direction). In detail, the first variable magnetic-force magnet 51 is formed in a rectangular shape in cross section, and its long-side direction is oriented in a direction parallel to the q-axis.

Further, in each of the plurality of magnetic pole parts 12, the first variable magnetic-force magnets 51 are symmetrical with respect to a virtual line (d-axis) which passes through the center of the fixed magnetic-force magnet 40 in the circumferential direction, and extends in the radial direction.

<Second Variable Magnetic-Force Magnet>

The second variable magnetic-force magnet 52 is disposed at a position between the fixed magnetic-force magnet 40 and each first variable magnetic-force magnet 51 in the circumferential direction. Each second variable magnetic-force magnet 52 is disposed radially outward of the fixed magnetic-force magnet 40 (in more detail, the same position as the first variable magnetic-force magnet 51).

The second variable magnetic-force magnet 52 opposes to the fixed magnetic-force magnet 40 in the circumferential direction with spacing therebetween. The circumferential length between the second variable magnetic-force magnet 52 and the q-axis is shorter than the circumferential length between the second variable magnetic-force magnet 52 and the fixed magnetic-force magnet 40.

The second variable magnetic-force magnet 52 is embedded in the rotor core 11. In this example, the second variable magnetic-force magnet 52 is accommodated in a second variable magnetic-force magnet hole S52 formed in the rotor core 11. Further, the second variable magnetic-force magnet 52 extends along the q-axis (the q-axis which is adjacent to the second variable magnetic-force magnet 52 in the circumferential direction). In detail, the second variable magnetic-force magnet 52 is formed in a rectangular shape in cross section, and its long-side direction is oriented in a direction parallel to the q-axis.

The second variable magnetic-force magnets 52 are symmetrical with respect to a virtual line (d-axis) which passes through the center of the fixed magnetic-force magnet 40 in the circumferential direction and extends in the radial direction.

<Magnetic Properties of Variable Magnetic-Force Magnet>

As for each of the first variable magnetic-force magnet 51 and the second variable magnetic-force magnet 52, a magnet with high flux density but small coercive force, such as a neodymium magnet, a samarium cobalt magnet, and alnico magnet, is used. Each of the first variable magnetic-force magnet 51 and the second variable magnetic-force magnet 52 is changeable of the magnetic force by a given magnetic flux (for example, the magnetic flux generated by the large current (for example, 750 Arms) which is outputtable from the drive battery 7 and the inverter 6). The first variable magnetic-force magnet 51 and the second variable magnetic-force magnet 52 are hardly magnetized with the current when normally driving the drive motor 2. At this time, the first variable magnetic-force magnet 51 and the second variable magnetic-force magnet 52 also function as permanent magnets.

In this example, the direction in which magnetization is easy for the first variable magnetic-force magnet 51 and the second variable magnetic-force magnet 52 is the circumferential direction (in more detail, a direction (tangential direction) perpendicular to the radial direction). The direction in which magnetization of the first variable magnetic-force magnet 51 is difficult is a direction (in this example, the radial direction) perpendicular to the magnetization-easy direction of the first variable magnetic-force magnet 51. The magnetization-difficult direction of the second variable magnetic-force magnet 52 is a direction (in this example, the radial direction) perpendicular to the magnetization-easy direction of the second variable magnetic-force magnet 52.

Further, in this example, each of the first variable magnetic-force magnet 51 and the second variable magnetic-force magnet 52 is switchable between a state where the magnetizing direction is oriented in a first direction, a state where the magnetizing direction is oriented in a second direction, and a zero state where the magnetic force becomes substantially zero. The first direction is a direction in which the magnetic flux which interlinks with the teeth 21b (effective magnetic flux) increases. The second direction is a direction in which the magnetic flux which interlinks with the teeth 21b (effective magnetic flux) decreases. For example, the first direction is a direction from the second magnetic pole part 12S to the first magnetic pole part 12N, and the second direction is a direction from the first magnetic pole part 12N to the second magnetic pole part 12S.

As for the first variable magnetic-force magnet 51 and the second variable magnetic-force magnet 52, in order to change the magnetization state in the circumferential direction by the same variable magnetic flux generated in the coil 22 of the stator 20, when the magnetizing direction of the first variable magnetic-force magnet 51 is the first direction, the magnetizing direction of the second variable magnetic-force magnet 52 also becomes the first direction, and when the magnetizing direction of the first variable magnetic-force magnet 51 is the second direction, the magnetizing direction of the second variable magnetic-force magnet 52 also becomes the second direction.

In the following description, a state where the magnetizing directions of the first variable magnetic-force magnet 51 and the second variable magnetic-force magnet 52 are oriented in the first direction is referred to as a "magnetizing state," and a state where the magnetizing directions of the first variable magnetic-force magnet 51 and the second variable magnetic-force magnet 52 are oriented in the second direction is referred to as a "demagnetizing state."

<First Auxiliary Fixed Magnetic-Force Magnet>

The first auxiliary fixed magnetic-force magnet 61 is disposed at a position radially outward of the fixed magnetic-force magnet 40. The position of the first auxiliary fixed magnetic-force magnet 61 in the radial direction is substantially the same position as the center position of the first variable magnetic-force magnet 51 and the second variable magnetic-force magnet 52 in the radial direction.

The first auxiliary fixed magnetic-force magnet 61 is embedded in the rotor core 11. In this example, the first auxiliary fixed magnetic-force magnet 61 is accommodated in a first auxiliary fixed magnetic-force magnet hole S61 formed in the rotor core 11. Further, the first auxiliary fixed magnetic-force magnet 61 extends along one end part of the fixed magnetic-force magnet 40 in the radial direction. In detail, the first auxiliary fixed magnetic-force magnet 61 is formed in a rectangular shape in cross section, and its long-side direction is oriented in the circumferential direction. The length of the first auxiliary fixed magnetic-force magnet 61 in the short-side direction is shorter than the length of the fixed magnetic-force magnet 40 in the short-side direction.

The first auxiliary fixed magnetic-force magnet 61 is magnetized so that its magnetizing direction becomes the same as the magnetizing direction of the fixed magnetic-force magnet 40. That is, the first auxiliary fixed magnetic-force magnet 61 of the first magnetic pole part 12N is magnetized so that its radially outward end becomes an N-pole. The fixed magnetic-force magnet 40 of the second magnetic pole part 12S is magnetized so that its radially outward end becomes an S-pole.

As for the first auxiliary fixed magnetic-force magnet 61, a magnet with high flux density and large coercive force, such as a neodymium magnet, is used. The first auxiliary fixed magnetic-force magnet 61 does not substantially change in the magnetization state, even if a given magnetic flux (for example, the magnetic flux generated by the large current (for example, 750 Arms) which is outputtable from the drive battery 7 and the inverter 6) is applied. The coercive force of the first auxiliary fixed magnetic-force magnet 61 is higher than the coercive forces of the first variable magnetic-force magnet 51 and the second variable magnetic-force magnet 52. Although these first auxiliary fixed magnetic-force magnets 61 may be different magnetic bodies, the same magnetic bodies are used in this rotor 10.

<Second Auxiliary Fixed Magnetic-Force Magnet>

The second auxiliary fixed magnetic-force magnets 62 are disposed on both sides of the fixed magnetic-force magnet 40 in the circumferential direction, respectively, so that the second auxiliary fixed magnetic-force magnets 62 are adjacent to this fixed magnetic-force magnet 40. The position of the second auxiliary fixed magnetic-force magnet 62 in the radial direction is the same as the fixed magnetic-force magnet 40.

Each second auxiliary fixed magnetic-force magnet 62 is embedded in the rotor core 11. In this example, each second auxiliary fixed magnetic-force magnet 62 is accommodated in a second auxiliary fixed magnetic-force magnet hole S62 formed in the rotor core 11. Further, each second auxiliary fixed magnetic-force magnet 62 extends along one end part of the fixed magnetic-force magnet 40 in the circumferential direction. In detail, the second auxiliary fixed magnetic-force magnet 62 is formed in a rectangular shape in cross section, and its long-side direction is oriented in the radial direction. The length of the second auxiliary fixed magnetic-force magnet 62 in the long-side direction is shorter than the length of the fixed magnetic-force magnet 40 in the short-side direction.

Each second auxiliary fixed magnetic-force magnet 62 is magnetized in the circumferential direction. In detail, each second auxiliary fixed magnetic-force magnet 62 of the first magnetic pole part 12N is magnetized so that the side closer to the fixed magnetic-force magnet 40 in the circumferential direction becomes an N-pole. Each second auxiliary fixed magnetic-force magnet 62 of the second magnetic pole part 12S is magnetized so that the side closer to the fixed magnetic-force magnet 40 in the circumferential direction becomes an S-pole.

As for the second auxiliary fixed magnetic-force magnet 62, a magnet with high flux density and large coercive force, such as a neodymium magnet, is used. The second auxiliary fixed magnetic-force magnet 62 does not substantially change in the magnetization state, even if a given magnetic flux (for example, a magnetic flux generated by the large current (for example, 750 Arms) which is outputtable from the drive battery 7 and the inverter 6) is applied. The coercive force of the second auxiliary fixed magnetic-force magnet 62 is higher than the coercive forces of the first variable magnetic-force magnet 51 and the second variable magnetic-force magnet 52. Although these second auxiliary fixed magnetic-force magnets 62 may be different magnetic bodies, the same magnetic bodies are used in this rotor 10.

<First Cavity Part>

Each magnetic pole part 12 has first cavity parts 71, each of which extends from a radially inward part of the fixed magnetic-force magnet 40 to an intermediate area of the first variable magnetic-force magnet 51 and the second variable magnetic-force magnet 52 in the circumferential direction. Two first cavity parts 71 are formed in each magnetic pole part 12. The first cavity parts 71 are formed so as to be symmetrical with respect to the d-axis.

Each first cavity part 71 extends from the position of the fixed magnetic-force magnet 40 in the circumferential direction toward the first variable magnetic-force magnet 51 so that its length in the radial direction becomes longer. A part of the first cavity part 71 which is located radially outermost is located radially inward of the radially inward end parts of the first variable magnetic-force magnet 51 and the second variable magnetic-force magnet 52.

<Second Cavity Part>

Each magnetic pole part 12 has a second cavity part 72 between the first auxiliary fixed magnetic-force magnet 61 and the first variable magnetic-force magnet 51 in the circumferential direction. Two second cavity parts 72 are formed in each magnetic pole part 12. The second cavity parts 72 are formed so as to become symmetrical with respect to the d-axis.

The second cavity part 72 extends in the radial direction from the position of the first auxiliary fixed magnetic-force magnet 61 to the position of the fixed magnetic-force magnet 40. Further, the second cavity part 72 extends in the circumferential direction from the position of the fixed magnetic-force magnet 40 to the position of the second variable magnetic-force magnet 52.

Figure 5:
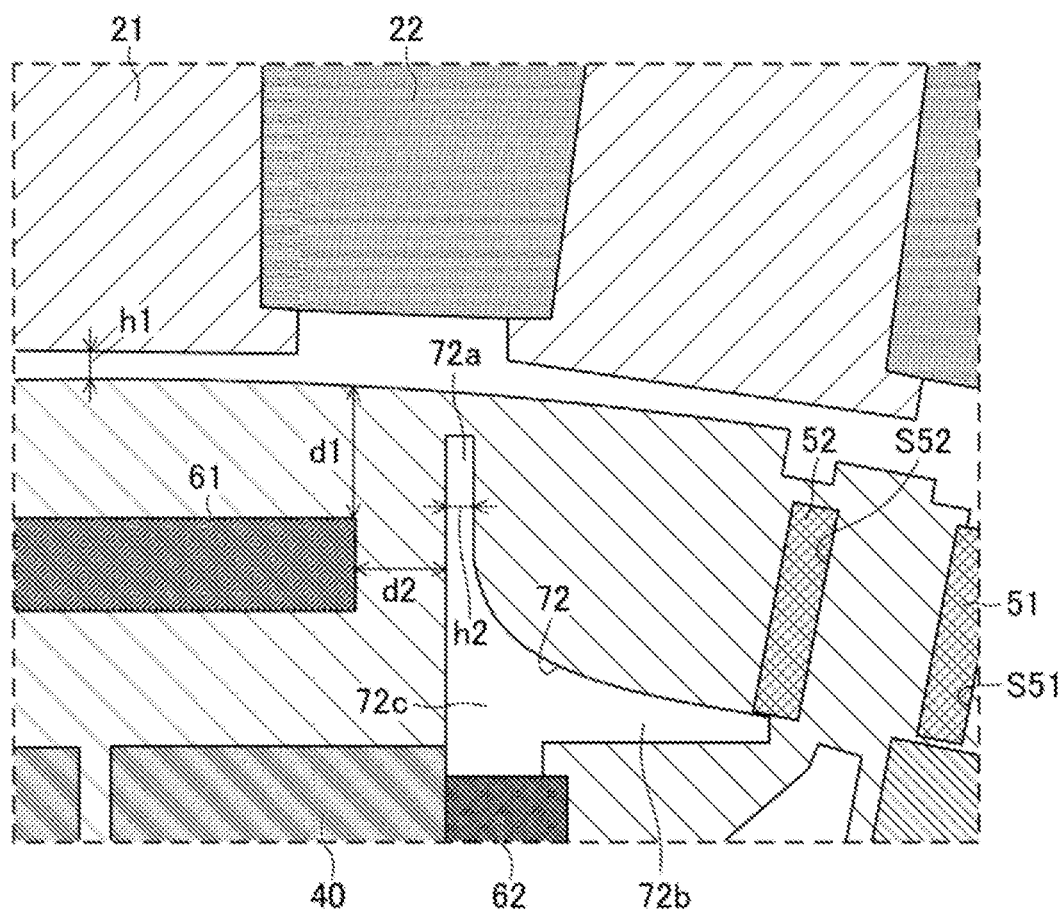
FIG. 5 is an enlarged cross-sectional view of the magnetic pole part, where an auxiliary fixed magnetic-force magnet and the periphery of a cavity are enlarged.

As illustrated in FIG. 5, the second cavity part 72 has a substantially T-shape. The second cavity part 72 has a vertically extending part 72a which extends in the radial direction, a laterally extending part 72b which extends in the circumferential direction, and an intersection part 72c where the vertically extending part 72a and the laterally extending part 72b intersect with each other.

A radially outward end part of the vertically extending part 72a is located radially outward of a radially outward end part of the first auxiliary fixed magnetic-force magnet 61. The width of the vertically extending part 72a in the circumferential direction is substantially constant from its radially outward end part up to the center position of the first auxiliary fixed magnetic-force magnet 61 in the radial direction, and it becomes wider therefrom toward radially inward. In more detail, the part of the vertically extending part 72a closer to the first auxiliary fixed magnetic-force magnet 61 in the circumferential direction extends along the short-side direction of the first auxiliary fixed magnetic-force magnet 61, and the part of the vertically extending part 72a on the side far from the first auxiliary fixed magnetic-force magnet 61 in the circumferential direction is curved from the center position of the first auxiliary fixed magnetic-force magnet 61 in the radial direction so that it approaches the second variable magnetic-force magnet 52 as it goes radially inward. Thus, the width of the second cavity part 72 in the circumferential direction is wider in the part radially inward of the first auxiliary fixed magnetic-force magnet 61 than the part radially outward of the first auxiliary fixed magnetic-force magnet 61.

A width h2 of a part of the vertically extending part 72a radially outward of the first auxiliary fixed magnetic-force magnet 61 is narrower than a minimum width h1 of the gap between the stator 20 and the rotor 10.

Further, spacing d2 between the first auxiliary fixed magnetic-force magnet 61 and the vertically extending part 72a in the circumferential direction is narrower than spacing d1 (which is the narrowest) between the first auxiliary fixed magnetic-force magnet 61 and an outer edge of the rotor core 11. In detail, assuming that the flux density inside the first auxiliary fixed magnetic-force magnet 61 is 1T, the spacing d2 is a dimension which satisfies the following formula, when the part of the rotor core 11 between the first auxiliary fixed magnetic-force magnet 61 and the vertically extending part 72a has 1.5 T or more.

$$d2 < (1/1.5) \times w$$

Here, w is the width of the first auxiliary fixed magnetic-force magnet 61 in the long-side direction. Note that 1.5 T is a flux density at which the electromagnetic steel plates constituting the rotor core 11 become in a magnetically saturated state.

The laterally extending part 72b extends to the center position of the second variable magnetic-force magnet 52 in the circumferential direction. The width of the laterally extending part 72b in the radial direction becomes gradually wider from the side closer to the second variable magnetic-force magnet 52 in the circumferential direction toward the far side. In more detail, the radially inward part of the laterally extending part 72b extends in the circumferential direction, and the part radially outward of the laterally extending part 72b is curved so that it is located more radially outward as it goes far away from the second variable magnetic-force magnet 52. The radially outward part of the laterally extending part 72b is curved so that it continues to the part of the vertically extending part 72a on the side far from the first auxiliary fixed magnetic-force magnet 61 in the circumferential direction.

The part of the second cavity part 72 which is adjacent to the fixed magnetic-force magnet 40 has a width in the circumferential direction wider than the width h2 of the vertically extending part 72a.

[Flow of Magnetic Flux in Demagnetizing State]

Figure 6:
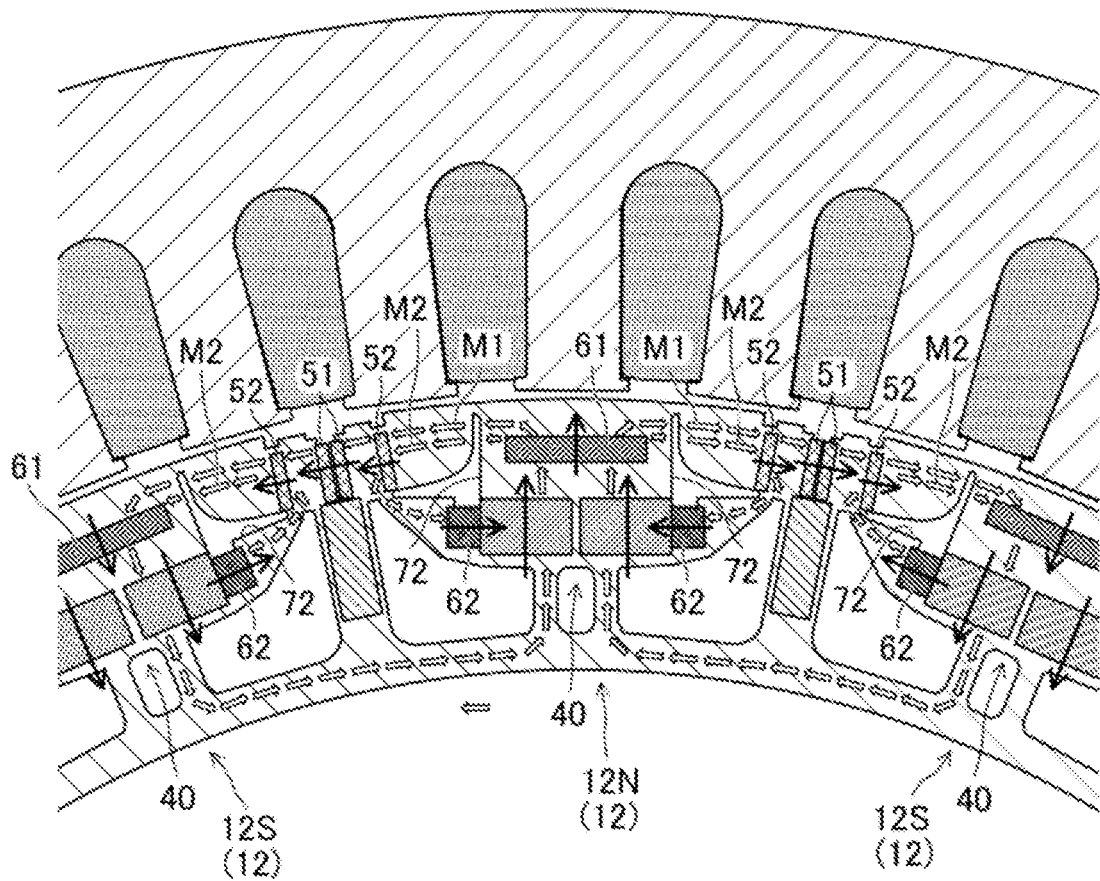
FIG. 6 is a schematic view illustrating a direction of a magnetic flux when the drive motor is in a demagnetizing state.

FIG. 6 illustrates a flow of the magnetic flux in the demagnetizing state. Black-line arrows in FIG. 6 illustrate the magnetizing directions of the magnets (the fixed magnetic-force magnet 40, the first variable magnetic-force magnet 51, the second variable magnetic-force magnet 52, the first auxiliary fixed magnetic-force magnet 61, and the second auxiliary fixed magnetic-force magnet 62). A white arrow in FIG. 6 illustrates a flow of the magnetic flux.

As illustrated in FIG. 6, since it is in the demagnetizing state, the magnetizing direction of each of the first variable magnetic-force magnet 51 and the second variable magnetic-force magnet 52 is a direction from the first magnetic pole part 12N to the second magnetic pole part 12S. At this time, in the rotor 10, a first closed magnetic path M1 is formed between the first magnetic pole part 12N and the second magnetic pole part 12S. In detail, the magnetic flux which came out radially outward from the fixed magnetic-force magnet 40 and the first auxiliary fixed magnetic-force magnet 61 of the first magnetic pole part 12N passes through the second cavity part 72 of the first magnetic pole part 12N, and goes into the second magnetic pole part 12S via the second variable magnetic-force magnet 52 and the first variable magnetic-force magnet 51 of the first magnetic pole part 12N. After that, the magnetic flux passes through the second cavity part 72 of the second magnetic pole part 12S via the first variable magnetic-force magnet 51 and the second variable magnetic-force magnet 52 of the second magnetic pole part 12S, and then goes into the fixed magnetic-force magnet 40 and the first auxiliary fixed magnetic-force magnet 61 of the second magnetic pole part 12S. After that, the magnetic flux which came out from the fixed magnetic-force magnet 40 and the first auxiliary fixed magnetic-force magnet 61 of the second magnetic pole part 12S passes through the part radially inward of the fixed magnetic-force magnet 40 of the rotor core 11, and then goes into the fixed magnetic-force magnet 40 of the first magnetic pole part 12N.

Further, as illustrated in FIG. 6, a second closed magnetic path M2 which is formed by the fixed magnetic-force magnet 40, the first auxiliary fixed magnetic-force magnet 61, the second variable magnetic-force magnet 52, and the second auxiliary fixed magnetic-force magnet 62 is formed in each magnetic pole part 12. In detail, inside the first magnetic pole part 12N, the magnetic flux which came out radially outward from the fixed magnetic-force magnet 40 and the first auxiliary fixed magnetic-force magnet 61 passes through the second cavity part 72, and then goes into the part of the rotor core 11 between the first cavity part 71 and the second cavity part 72 via the second variable magnetic-force magnet 52. After that, this magnetic flux goes into the fixed magnetic-force magnet 40 via the second auxiliary fixed magnetic-force magnet 62, or goes into the fixed magnetic-force magnet 40 directly. On the other hand, inside the second magnetic pole part 12S, the magnetic flux which came out from the fixed magnetic-force magnet 40 and the second auxiliary fixed magnetic-force magnet 62 passes through the part of the rotor core 11 between the first cavity part 71 and the second cavity part 72, and then reaches the second variable magnetic-force magnet 52. After that, this magnetic flux passes through the second cavity part 72, and goes into the fixed magnetic-force magnet 40 via the first auxiliary fixed magnetic-force magnet 61, or goes into the fixed magnetic-force magnet 40 directly.

Since the magnetic reluctance of the gap is larger as compared with the rotor core 11, the magnetic flux tends to pass through a gap part which is as narrow as possible. In this embodiment, the width h2 of the part of the vertically extending part 72a of the second cavity part 72, which is radially outward of the first auxiliary fixed magnetic-force magnet 61 is narrower than the minimum width h1 of the gap between the stator 20 and the rotor 10. Thus, radially outward of the first auxiliary fixed magnetic-force magnet 61, the magnetic flux flows so that it passes through the second cavity part 72 and again goes into the rotor core 11, rather than leaking from the rotor 10 outside. Therefore, the closed magnetic path is formed between the first magnetic pole part 12N and the second magnetic pole part 12S to suppress the magnetic flux leakage from the rotor 10.

Further, a short circuit of the magnetic flux of the first auxiliary fixed magnetic-force magnet 61 itself is suppressed by the second cavity part 72, and the magnetic flux from the first auxiliary fixed magnetic-force magnet 61 flows from the first auxiliary fixed magnetic-force magnet 61 toward the second variable magnetic-force magnet 52.

Effects of Embodiment 1

As described above, in the rotor 10 having the rotor structure of Embodiment 1, the short circuit of the magnetic flux of the first auxiliary fixed magnetic-force magnet 61 itself is suppressed by providing the second cavity part 72. Further, by setting the width h2 of the vertically extending part 72a of the second cavity part 72 in the circumferential direction narrower than the minimum width h1 of the gap between the stator 20 and the rotor 10, the magnetic flux from the fixed magnetic-force magnet 40 and the first auxiliary fixed magnetic-force magnet 61 of the first magnetic pole part 12N becomes easier to go toward the first variable magnetic-force magnet 51 of the first magnetic pole part 12N in the demagnetizing state. Therefore, the first closed magnetic path M1 can be formed between the first magnetic pole part 12N and the second magnetic pole part 12S, and the leakage of the magnetic flux to the stator 20 can be suppressed as much as possible. As a result, the iron loss can be suppressed as much as possible.

Therefore, in the rotor 10 of Embodiment 1, when magnets which are difficult to change in the magnetizing direction are lined up in the radial direction, the short circuit of the magnetic flux of the magnet located radially outward (here, the first auxiliary fixed magnetic-force magnet 61) can be suppressed, and the iron loss in the demagnetizing state can be suppressed as much as possible.

Further, in the rotor 10 of Embodiment 1, the width of the second cavity part 72 in the circumferential direction is wider in the part radially inward of the first auxiliary fixed magnetic-force magnet 61 than in the part radially outward of the first auxiliary fixed magnetic-force magnet 61. Therefore, the short circuit of the magnetic flux of the first auxiliary fixed magnetic-force magnet 61 can be suppressed more effectively.

Further, in the rotor 10 of Embodiment 1, the spacing d2 between the first auxiliary fixed magnetic-force magnet 61 and the second cavity part 72 in the circumferential direction is narrower than the narrowest spacing d1 between the first auxiliary fixed magnetic-force magnet 61 and the outer edge of the rotor core 11. Therefore, the short circuit of the magnetic flux of the first auxiliary fixed magnetic-force magnet 61 can be suppressed more effectively.

Further, in the rotor 10 of Embodiment 1, each magnetic pole part 12 has the second variable magnetic-force magnet 52 between the second cavity part 72 and the first variable magnetic-force magnet 51. Each second variable magnetic-force magnet 52 is changeable of the magnetization state in the circumferential direction by the given magnetic flux. Therefore, the magnetic flux from the fixed magnetic-force magnet 40 and the first auxiliary fixed magnetic-force magnet 61 becomes easier to go toward the first variable magnetic-force magnet 51 by the second variable magnetic-force magnet 52. Accordingly, since it becomes easier to form the first closed magnetic path M1 between the first magnetic pole part 12N and the second magnetic pole part 12S, the iron loss can be suppressed more effectively.

Further, in addition to the second variable magnetic-force magnet 52, the rotor 10 of Embodiment 1 has the two second auxiliary fixed magnetic-force magnets 62 which are disposed adjacent to the fixed magnetic-force magnet 40 at both sides of the fixed magnetic-force magnet 40 in the circumferential direction. Therefore, the second closed magnetic path M2 is also formed inside each magnetic pole part 12. Therefore, the leakage of the magnetic flux from the rotor 10 can be suppressed, and the iron loss can be suppressed more effectively.

Embodiment 2

Figure 7:
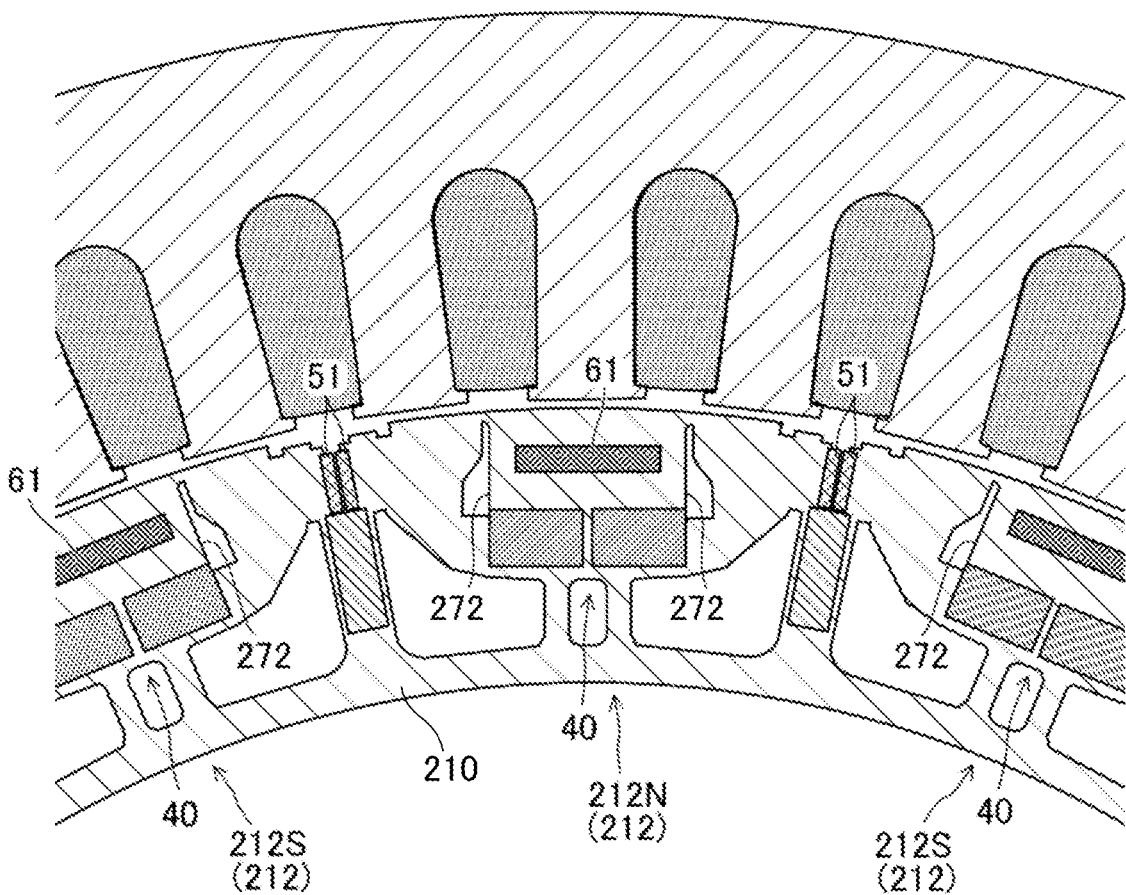
FIG. 7 is an enlarged cross-sectional view illustrating a rotor structure according to Embodiment 2.

Hereinafter, Embodiment 2 is described in detail with reference to FIG. 7. Note that in the following description, the same reference characters are assigned to parts which are common with Embodiment 1 to omit the detailed description thereof.

A rotor 210 of Embodiment 2 differs from that of Embodiment 1 in that the second variable magnetic-force magnet 52 and the second auxiliary fixed magnetic-force magnet 62 are not provided, and that the shape of a second cavity part 272 differs.

The second cavity part 272 does not have the laterally extending part in Embodiment 1, but is only comprised of the vertically extending part. Also in Embodiment 2, the width of the second cavity part 272 in the circumferential direction is wider in the part radially inward of the first auxiliary fixed magnetic-force magnet 61 than the part radially outward of the first auxiliary fixed magnetic-force magnet 61.

Further, also in Embodiment 2, the width of the part of the second cavity part 272 which is radially outward of the first auxiliary fixed magnetic-force magnet 61 is narrower than the minimum width of the gap between the stator 20 and the rotor 210. Further, the spacing d2 between the first auxiliary fixed magnetic-force magnet 61 and the second cavity part 272 in the circumferential direction is narrower than the narrowest spacing d1 between the first auxiliary fixed magnetic-force magnet 61 and the outer edge of the rotor core 11.

Also by the configuration of Embodiment 2, the short circuit of the magnetic flux of the first auxiliary fixed magnetic-force magnet 61 can be suppressed. Further, since the magnetic flux from the first auxiliary fixed magnetic-force magnet 61 tends to go toward the first variable magnetic-force magnet 51 rather than toward the stator 20, the closed magnetic path is easy to be formed between a first magnetic pole part 212N and a second magnetic pole part 212S of a magnetic pole part 212. Thus, the iron loss can be suppressed effectively.

Other Embodiments

The art disclosed herein is not limited to the embodiments described above, and substitution is possible without departing from the subject matter of the appended claims.

In Embodiments 1 and 2 described above, the hybrid vehicle is illustrated as a target to which the motor having the rotor 10 or 210 is applied. Without being limited to this configuration, the motor having the rotor 10 or 210 is also applicable to an electric vehicle which does not have the engine E.

The above embodiments are merely illustration, and therefore, the scope of the present disclosure must not be interpreted restrictively. The scope of the present disclosure is defined by the appended claims, and all modifications and changes which belong to an equivalent range of the appended claims are also encompassed within the present disclosure.

INDUSTRIAL APPLICABILITY

The art disclosed herein is useful as the rotor structure of the rotary electric machine provided with the rotor having the rotor core, and the stator having the stator core which is separated from the rotor core with spacing therebetween.

DESCRIPTION OF REFERENCE CHARACTERS

10 Rotor
11 Rotor Core
12 Magnetic Pole Part
12N First Magnetic Pole Part (One Magnetic Pole Part)
12S Second Magnetic Pole Part (Another Magnetic Pole Part)
20 Stator
21 Stator Core
40 Fixed Magnetic-force Magnet
51 First Variable Magnetic-force Magnet
52 Second Variable Magnetic-force Magnet
61 First Auxiliary Fixed Magnetic-force Magnet
72 Second Cavity Part
210 Rotor
d1 Spacing between Auxiliary Fixed Magnetic-force Magnet and Outer Edge of Rotor Core
d2 Spacing between Auxiliary Fixed Magnetic-force Magnet and Cavity Part
h1 Minimum Width between Rotor and Stator
h2 Width of Cavity Part in Circumferential Direction

What is claimed is:

1. A rotor structure of a rotary electric machine, the rotor structure comprising:
    a rotor having a rotor core;
    a stator having a stator core, the stator core being disposed radially outward of the rotor core and being separated from the rotor core with a gap therebetween; and
    a plurality of magnetic pole parts provided to the rotor core and lined up in a circumferential direction of the rotor core, each of the magnetic pole parts including:
        a fixed magnetic-force magnet configured to be magnetized in a radial direction of the rotor core;
        an auxiliary fixed magnetic-force magnet disposed radially outward of the fixed magnetic-force magnet, and magnetized in the radial direction so that a magnetizing direction thereof becomes the same direction as that of the fixed magnetic-force magnet; and
        first variable magnetic-force magnets disposed at both sides of the fixed magnetic-force magnet in the circumferential direction, respectively, a magnetization state of the first variable magnetic-force magnets being changeable in the circumferential direction by a given magnetic flux,
    wherein magnetizing directions of the fixed magnetic-force magnet and the auxiliary fixed magnetic-force magnet of one of the magnetic pole parts and magnetizing directions of the fixed magnetic-force magnet and the auxiliary fixed magnetic-force magnet of another magnetic pole part adjacent to the one magnetic pole part are opposite from each other,
    wherein the first variable magnetic-force magnets are located radially outward of the fixed magnetic-force magnet,
    wherein a cavity part is formed in the rotor core, between the auxiliary fixed magnetic-force magnet and the first variable magnetic-force magnets in the circumferential direction, the cavity part extending from the auxiliary fixed magnetic-force magnet to the fixed magnetic-force magnet in the radial direction, and
    wherein a width of the cavity part in the circumferential direction at a position of the auxiliary fixed magnetic-force magnet in the radial direction is narrower than a minimum width of the gap between the rotor core and the stator core.

2. The rotor structure of claim 1, wherein the width of the cavity part in the circumferential direction is wider in a part of the cavity part radially inward of the auxiliary fixed magnetic-force magnet than a part of the cavity part radially outward of the auxiliary fixed magnetic-force magnet.

3. The rotor structure of claim 2, wherein spacing between the auxiliary fixed magnetic-force magnet and the cavity part in the circumferential direction is narrower than spacing between the auxiliary fixed magnetic-force magnet and an outer edge of the rotor core in the radial direction.

4. The rotor structure of claim 3,
    wherein the first variable magnetic-force magnets are disposed adjacent to a q-axis, and
    wherein each of the magnetic pole parts has a respective second variable magnetic-force magnet between the cavity part and each first variable magnetic-force magnet, a magnetization state of each second variable magnetic-force magnet being changeable in the circumferential direction by the given magnetic flux.

5. The rotor structure of claim 1, wherein spacing between the auxiliary fixed magnetic-force magnet and the cavity part in the circumferential direction is narrower than spacing between the auxiliary fixed magnetic-force magnet and an outer edge of the rotor core in the radial direction.

6. The rotor structure of claim 1,
    wherein the first variable magnetic-force magnets are disposed adjacent to a q-axis, and
    wherein each of the magnetic pole parts has a respective second variable magnetic-force magnet between the cavity part and each first variable magnetic-force magnet, a magnetization state of each second variable magnetic-force magnet being changeable in the circumferential direction by the given magnetic flux.

7. The rotor structure of claim 2,
    wherein the first variable magnetic-force magnets are disposed adjacent to a q-axis, and
    wherein each of the magnetic pole parts has a respective second variable magnetic-force magnet between the cavity part and each first variable magnetic-force magnet, a magnetization state of each second variable magnetic-force magnet being changeable in the circumferential direction by the given magnetic flux.

8. The rotor structure of claim 1,
    wherein the auxiliary fixed magnetic-force magnet is formed in a rectangular shape in cross section and extends along one end part of the fixed magnetic-force magnet in the radial direction, and wherein a long-side direction of the auxiliary fixed magnetic-force magnet is oriented in the circumferential direction, and a length of the auxiliary fixed magnetic-force magnet in a short-side direction is shorter than a length of the fixed magnetic-force magnet in the short-side direction.

9. The rotor structure of claim 1, wherein the magnetic pole parts include a second variable magnetic-force magnet, and wherein the cavity part extends in the radial direction from the position of the auxiliary fixed magnetic-force magnet to a position of the fixed magnetic-force magnet, and extends in the circumferential direction from a position of the fixed magnetic-force magnet to a position of the second variable magnetic-force magnet.

* * * * *